United States Patent [19]

Howard et al.

[11] Patent Number: 5,625,386
[45] Date of Patent: Apr. 29, 1997

[54] METHOD AND APPARATUS FOR INTERLEAVING DISPLAY BUFFERS

[75] Inventors: Brian D. Howard, Menlo Park; Robert L. Bailey, San Jose, both of Calif.

[73] Assignee: Apple Computer, Inc., Cupertino, Calif.

[21] Appl. No.: 315,653

[22] Filed: Sep. 30, 1994

[51] Int. Cl.$^6$ ........................................ G09G 5/00
[52] U.S. Cl. .................... 345/201; 345/1; 345/189; 395/507
[58] Field of Search .................... 345/1, 3, 201, 345/98, 203, 196, 200, 185, 189; 395/165, 164

[56] References Cited

U.S. PATENT DOCUMENTS

| | | |
|---|---|---|
| 4,740,786 | 4/1988 | Smith .................................. 345/3 |
| 4,924,410 | 5/1990 | Hamada .............................. 345/1 |
| 5,387,923 | 2/1995 | Mattison et al. .................... 345/98 |
| 5,428,743 | 6/1995 | Takai .................................. 345/201 |

*Primary Examiner*—Richard Hjerpe
*Assistant Examiner*—Kent Chang
*Attorney, Agent, or Firm*—Richard C. Liu

[57] ABSTRACT

A method and an apparatus for interleaving display frame buffers is disclosed. The system includes a processor providing CPU addresses for peripheral access, a display system, a single memory system for storing multiple frame buffers, data buses for transferring image information and a video controller for processing the image information received and for converting CPU addresses into memory addresses for accessing the memory system. The multiple frame buffers stored in the memory system in accordance with the present invention provide either overlay images for a display or separate images for separate displays or both.

18 Claims, 9 Drawing Sheets

640x480 x    1bt/pxl   =      38,400 bytes

640x480 x    2bts/pxl  =      76,800 bytes

640x480 x    4bts/pxl  =     153,600 bytes

640x480 x    8bts/pxl  =     307,200 bytes

640x480 x    16bts/pxl =     614,400 bytes

640x480 x    24bts/pxl =     921,600 bytes

640x480 x    32bts/pxl =   1,228,800 bytes

FIG. 1A 2 x 128Kx8   =    262,144 bytes
or   1 x 128Kx16

2 x 256Kx8   =    524,288 bytes
or   1 x 256Kx16

2 x 512Kx8   =  1,048,576 bytes
or   1 x 512Kx16

4 x 128Kx8   =    524,288 bytes
or   2 x 128Kx16

4 x 256Kx8   =  1,048,576 bytes
or   2 x 256Kx16

4 x 512Kx8   =  2,097,152 bytes
or   2 x 512Kx16

FIG. 1B

```
          640x480 x     8bts/pxl
        + 640x480 x     1 bt/pxl   =    345,600 bytes 640x480 x     8bts/pxl
        + 640x480 x     2bts/pxl   =    384,000 bytes 640x480 x     8bts/pxl
        + 640x480 x     4bts/pxl   =    460,800 bytes 640x480 x     8bts/pxl
        + 640x480 x     8bts/pxl   =    614,400 bytes 640x480 x    16bts/pxl
        + 640x480 x     1 bt/pxl   =    652,800 bytes 640x480 x    16bts/pxl
        + 640x480 x     2bts/pxl   =    691,200 bytes 640x480 x    16bts/pxl
        + 640x480 x     4bts/pxl   =    768,000 bytes 640x480 x    16bts/pxl
        + 640x480 x     8bts/pxl   =    921,600 bytes 640x480 x    16bts/pxl
        + 640x480 x    16bts/pxl   =  1,228,800 bytes 640x480 x    24bts/pxl
        + 640x480 x     1 bt/pxl   =  1,228,800 bytes 640x480 x    24bts/pxl
        + 640x480 x     2bts/pxl   =  1,228,800 bytes 640x480 x    24bts/pxl
        + 640x480 x     4bts/pxl   =  1,228,800 bytes 640x480 x    24bts/pxl
        + 640x480 x     8bts/pxl   =  1,228,800 bytes 640x480 x    24bts/pxl
        + 640x480 x    16bts/pxl   =  1,843,200 bytes 640x480 x    24bts/pxl
        + 640x480 x    24bts/pxl   =  2,457,600 bytes
```

FIG. 2

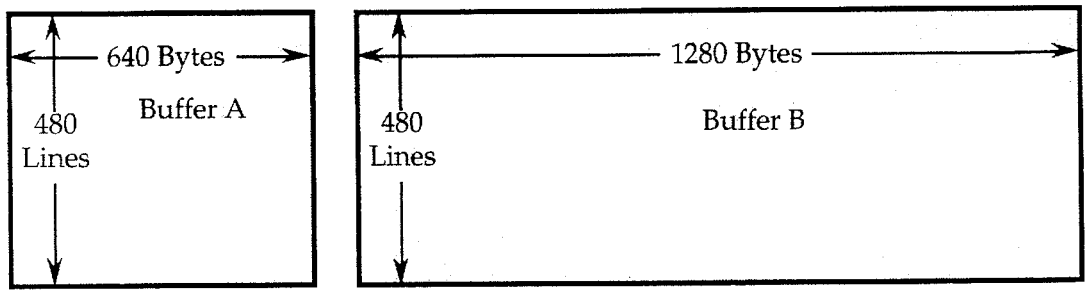
FIG. 4A
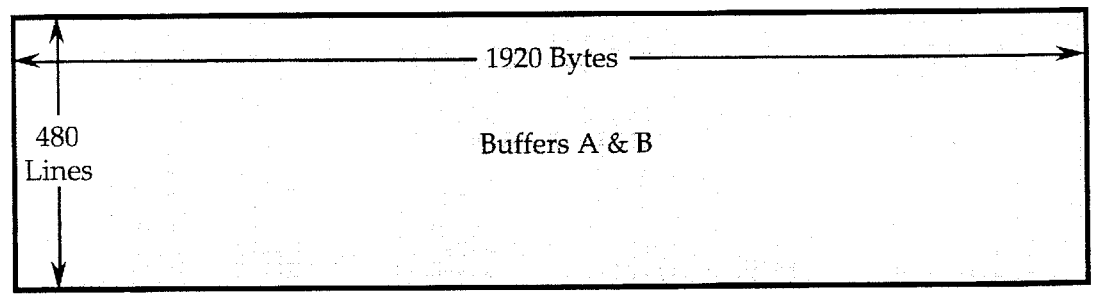
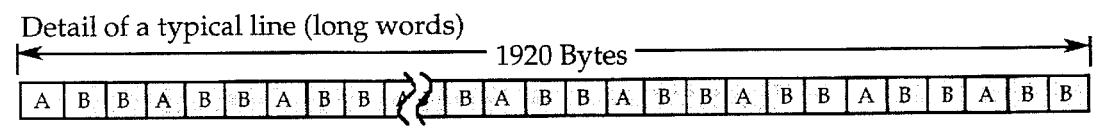
FIG. 4B

| VRAM Column Address Bits | B/A = 1 | B/A = 2 | Buffer Address Bits B/A = 4 | B/A = 8 | B/A = 16 |
|---|---|---|---|---|---|
| 5 4 3 2 1 0 | 5 4 3 2 | 5 4 3 2 | 5 4 3 2 | 5 4 3 2 | 6 5 4 3 2 |
| 0 0 0 0 0 0 | A 0 0 0 0 | A 0 0 0 0 | A 0 0 0 0 | A 0 0 0 0 | A 0 0 0 0 0 |
| 0 0 0 0 0 1 | B 0 0 0 0 | B 0 0 0 0 | B 0 0 0 0 | B 0 0 0 0 | B 0 0 0 0 0 |
| 0 0 0 0 1 0 | A 0 0 0 1 | B 0 0 0 1 | B 0 0 0 1 | B 0 0 0 1 | B 0 0 0 0 1 |
| 0 0 0 0 1 1 | B 0 0 0 1 | A 0 0 0 1 | B 0 0 1 0 | B 0 0 1 0 | B 0 0 0 1 0 |
| 0 0 0 1 0 0 | A 0 0 1 0 | B 0 0 1 0 | B 0 0 1 1 | B 0 0 1 1 | B 0 0 0 1 1 |
| 0 0 0 1 0 1 | B 0 0 1 0 | B 0 0 1 1 | A 0 0 0 1 | B 0 1 0 0 | B 0 0 1 0 0 |
| 0 0 0 1 1 0 | A 0 0 1 1 | A 0 0 1 0 | B 0 1 0 0 | B 0 1 0 1 | B 0 0 1 0 1 |
| 0 0 0 1 1 1 | B 0 0 1 1 | B 0 1 0 0 | B 0 1 0 1 | B 0 1 1 0 | B 0 0 1 1 0 |
| 0 0 1 0 0 0 | A 0 1 0 0 | B 0 1 0 1 | B 0 1 1 0 | B 0 1 1 1 | B 0 0 1 1 1 |
| 0 0 1 0 0 1 | B 0 1 0 0 | A 0 0 1 1 | B 0 1 1 1 | A 0 0 0 1 | B 0 1 0 0 0 |
| 0 0 1 0 1 0 | A 0 1 0 1 | B 0 1 1 0 | A 0 0 1 0 | B 1 0 0 0 | B 0 1 0 0 1 |
| 0 0 1 0 1 1 | B 0 1 0 1 | B 0 1 1 1 | B 1 0 0 0 | B 1 0 0 1 | B 0 1 0 1 0 |
| 0 0 1 1 0 0 | A 0 1 1 0 | A 0 1 0 0 | B 1 0 0 1 | B 1 0 1 0 | B 0 1 0 1 1 |
| 0 0 1 1 0 1 | B 0 1 1 0 | B 1 0 0 0 | B 1 0 1 0 | B 1 0 1 1 | B 0 1 1 0 0 |
| 0 0 1 1 1 0 | A 0 1 1 1 | B 1 0 0 1 | B 1 0 1 1 | B 1 1 0 0 | B 0 1 1 0 1 |
| 0 0 1 1 1 1 | B 0 1 1 1 | A 0 1 0 1 | A 0 0 1 1 | B 1 1 0 1 | B 0 1 1 1 0 |
| 0 1 0 0 0 0 | A 1 0 0 0 | B 1 0 1 0 | B 1 1 0 0 | B 1 1 1 0 | B 0 1 1 1 1 |
| 0 1 0 0 0 1 | B 1 0 0 0 | B 1 0 1 1 | B 1 1 0 1 | B 1 1 1 1 | A 0 0 0 0 1 |
| 0 1 0 0 1 0 | A 1 0 0 1 | A 0 1 1 0 | B 1 1 1 0 | A 0 0 1 0 | B 1 0 0 0 0 |

FIG. 7

METHOD AND APPARATUS FOR INTERLEAVING DISPLAY BUFFERS

The present invention is related to U.S. patent applications Ser. No. 08/315,654, filed Sep. 30, 1994, entitled "An Efficient Arrangement of Frame Buffers", now abandoned, and Ser. No. 08/316,651 filed Sep. 30, 1994, entitled "An Arrangement of Frame Buffers For Dual-Panel Displays", all assigned to the assignee of the present invention and filed concurrently herewith.

This invention relates generally to a processor-controlled system such as a computer system and, more particularly, but not exclusively, to an electrical arrangement in the system for displaying information on associated display monitor(s).

Among the many image resolutions for computer displays in the market today, a common resolution for computer displays is 640×480. Such resolution for a display refers to a display having an overall screen measuring 640 pixels wide by 480 lines high. But a frame buffer servicing this display at typical bit-per-pixel rates fits very inefficiently into any standard sizes of memory components, leaving large amounts of memory unused. But for those systems operatively requiring additional frame buffers, this memory management inefficiency could be cured by storing more than one frame buffer into a single physical memory system. For example, referring to the frame buffer and memory size tables shown in FIGS. 1A and 1B, a 640×480 display at 16 bits per pixel requires 614,400 bytes to store its data, but the smallest memory size available for such a frame buffer is 1,048,576 bytes. This leaves 434,176 bytes of memory unused, enough to store a second 640×480 frame buffer at 8 bits per pixel. FIG. 2 illustrates typical memory size requirements for storing both frame buffers for a 640×480 display.

Processor-controlled systems including an image display often have needs for more than one frame buffer in order to store additional image information from sources such as live TV video and a pen input device overlaying (or underlaying) such external images onto the normal display image. Additional frame buffers are also used in systems where there are at least two different image displays, e.g., a built-in LCD display and an external CRT monitor.

It would be desirable and therefore an object for the present invention to store multiple overlaying images in a single memory system, e.g., a VRAM, or a DRAM system, where the multiple sets of image data are to be accessed "simultaneously" in a data stream from that memory. VRAM is dual-ported in that image data used to refresh the display(s) is clocked out of one data port while the processor updates the image data through another port of the VRAM. On the other hand, image data in DRAM is accessed for refresh and updates via a single port. In fact, the embodiments disclosed hereinafter are better adapted for VRAM usage but the invention can be easily re-configured by an artisan to use other types of memory including DRAM. It is another object of the invention to provide for an image display system wherein a first frame buffer is stored in a memory system and wherein a second frame buffer to be overlaid onto the display image is stored in the same memory system using previously wasted memory cells; it is yet a further object for said image display system to concurrently display images from both frame buffers onto separate displays.

Unlike the single-frame buffer mode in the prior art where the frame buffer is accessed via one CPU-driven Frame-buffer Select signal, e.g., FS0, one aspect of the present invention discloses a two-frame buffer mode operating using a single memory system wherein each frame buffer is accessed by one of a pair of CPU-driven Frame-buffer Select signals, e.g., FS0 and FS1. FS0 is a signal typically dependent on the high-order bits of the CPU address. Its assertion indicates a CPU access in the address range corresponding to the stored image data. Similarly, the assertion of FS1 indicates a CPU access in the address range corresponding to the stored data for a second frame buffer. FS0 and FS1 may be generated by external logic or from within a video display controller. Another aspect of the present invention includes an arrangement for manipulating the addressing of the memory system on data reads and writes, the two frame buffers are made to appear individually separate and distinct to software, but the image data from the two logical frame buffers are distributed uniformly throughout the physical memory so the streams of data from the two logical frame buffers arrive correctly interleaved when accessed sequentially by the video display controller. The video display controller functions as a memory address controller that takes in a contiguous range of CPU addresses used for accessing the logical frame buffers and converts those addresses to the interleaved memory addresses for accessing the physical memory. Also, it includes logic for processing video data for the display system.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 1A is a table listing frame buffer size requirements for a 640×480 display at varying bit-per-pixel rates;

FIG. 1B is a table listing common VRAM memory sizes;

FIG. 2 is a table illustrating memory requirements for storing two 640×480 frame buffers at varying bit-per-pixel rates;

FIG. 4A illustrates how an 8-bit-per-pixel frame buffer A and a 16-bit-per-pixel frame buffer B of FIG. 3 for a 640×480 display are viewed by software;

FIG. 4B illustrates how frame buffers in FIG. 4A are interleaved in an embodiment in accordance with the present invention and illustrates a word-by-word diagram of a data stream of the frame buffers being delivered to the video display controller of FIG. 3;

FIG. 7 is a partial VRAM and CPU address table for embodiments in accordance with the present invention in which the bit-per-pixel ratios between the two frame buffers is a parameter;

DESCRIPTION OF EMBODIMENTS

A novel method and apparatus are described for arranging two logical frame buffers into a single memory system for display operations of a computer. The particular electronic implementation of the present invention should not be seen as limiting because the present invention may be suitable for use in any electronically controlled system requiring the use of at least two logical frame buffers for display operations. Throughout this detailed description numerous details are set forth in order to provide a thorough understanding of the present invention, for example, multiple references are made to specific data word bit-widths of communication lines. These specific values are exemplary only. To one skilled in the art, however, it will be appreciated that the present invention may be practiced without such specific details and that a wide range of data-word-bit-width values can be used within the scope of the present invention. In other instances, well-known methods, procedures, control structures and gate level circuits have not been shown in detail in order not to obscure the present invention.

With today's device technology, the development of specialized integrated circuits and programmable logic generally do not require the rendering of fully detailed circuit diagrams. The definition of logic functionality allow computer design techniques to design the desired logic and circuits. Additionally, microcontrollers are known to operate based on a desired flow diagram rendered into software that is compatible with a selected microcontroller. Accordingly, portions of the present invention will be described primarily in terms of functionality to be implemented by a microcontroller and other associated electronic components. This functionality will be described and those of ordinary skill in the art, once given the following descriptions of the various functions to be carried out by the present invention will be able to implement the necessary microcontroller structure and logic for various logic devices or custom designed integrated circuits in suitable technologies without undue experimentation.

Figure 3:
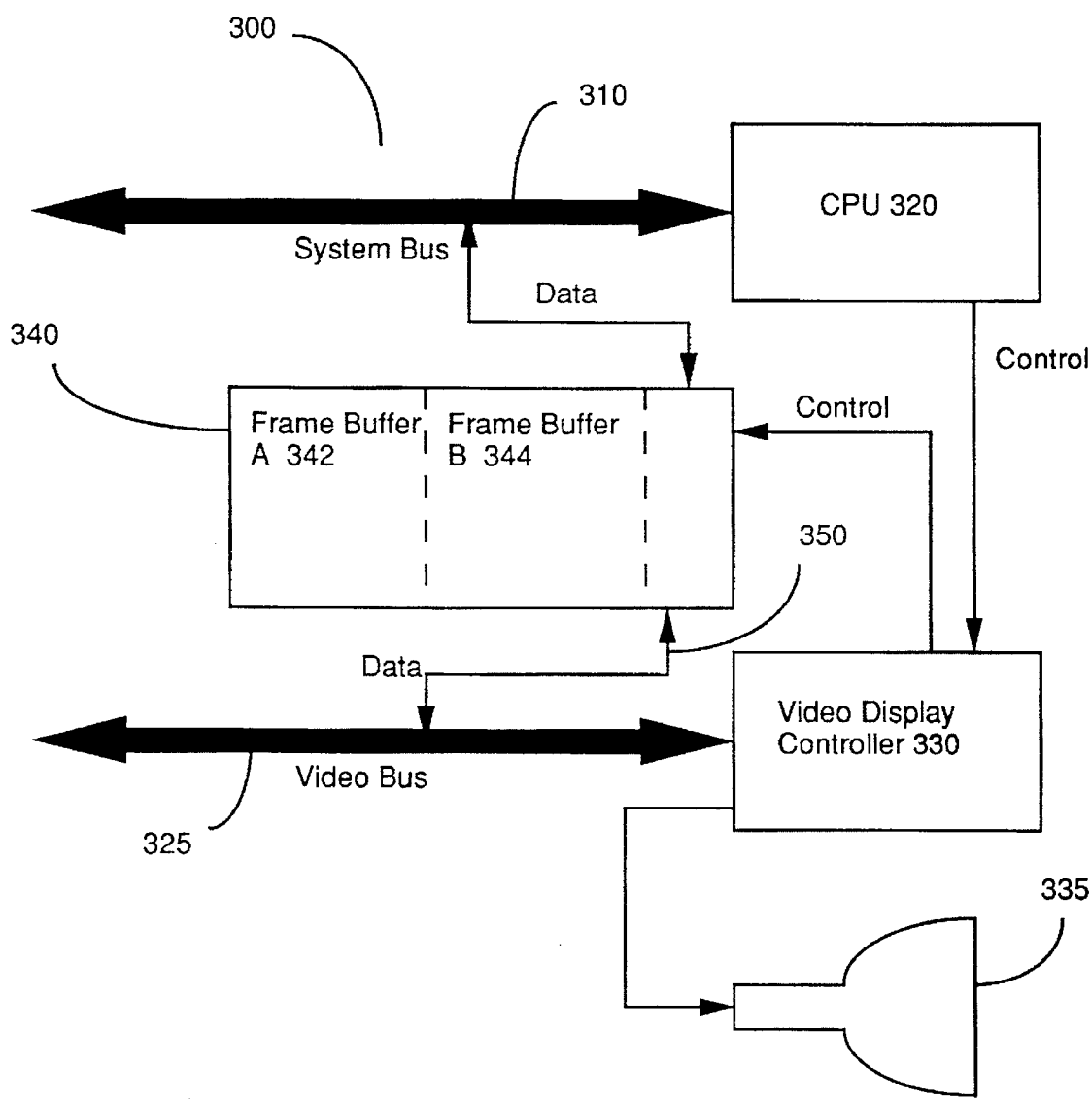
FIG. 3 is a functional diagram illustrating a partial computer system in accordance with the present invention wherein logical frame buffers A and B reside in a single physical memory system.

FIG. 3 is a block diagram illustrating a partial computer system 300 in accordance with the present invention. This computer system 300 comprises a system bus 310 and a video bus 325 for carrying information, a CPU 320 coupled to the system bus 310 for processing information and instructions, a video display controller 330 coupled to the video bus 325 for processing image information and for directing the processed image information to an associated display 335, and moreover two logical frame buffers A and B 342, 344 both being operatively stored in a single memory 340. This memory 340 is coupled singly to the system bus 310 and the video bus 325 for receiving and dispatching image information, and coupled to the video display controller 330 for receiving control signals, and being further coupled to the video display controller 330 via a sequential, multiple-bit line 350. A preferred line bit-width for the memory 340 is 32 bits for carrying a four-byte word worth of information per data clock cycle. The display 335 utilized with the computer system 300 may be a liquid crystal device, cathode ray tube, or other display devices suitable for creating graphic images and alphanumeric characters recognizable to the user. In fact, the display 335 is generic in that it could represent more than one display.

In accordance with one aspect of the present invention, a four-byte word worth of data from the lower bit-per-pixel frame buffer, for example, frame buffer A 342, is clocked out to the video display controller 330 via the multi-bit line 350 among the four-byte words of data from the higher bit-per-pixel frame buffer B 344 so image data from both frame buffers are transferred to the input port of the video display controller 330 "simultaneously". For example, FIG. 4A shows the frame buffer A 342 stores image data at 8 bits per pixel and the frame buffer B 344 stores data at 16 bits per pixel. FIG. 4A further illustrates how these frame buffers 342, 344 are viewed by software, which is also how each frame buffer would be physically stored in the memory 340 if it were the only frame buffer. On the other hand, FIG. 4B illustrates how the two logical frame buffers 342, 344 are physically interleaved and stored together in the memory 340. In this manner, each pixel data clock cycle will cause the video display controller 330 to receive either 4 data pixels from the frame buffer A 342 or 2 pixels of data from the frame buffer B 344. The video display controller 330 knowing the sequence of the interleaved image data from the two frame buffers 342, 344, separates the data stream on the multi-bit line 350 into two data streams and stores them separately and in a timed manner into two registers. The video display controller 330 then uses the image data one pixel's-worth at a time from each of the two registers, compares one frame buffer's pixel data to that of another, and basing on the comparison result sends the pixel data from one register or the other on to the remainder of the display system such as the display 335. In another embodiment, each frame buffer is to be used by a separate display; and in this case, the video display controller 330 processes and separates the interleaved data stream into two and directs each of them to its associated display for usage.

Figure 5A:
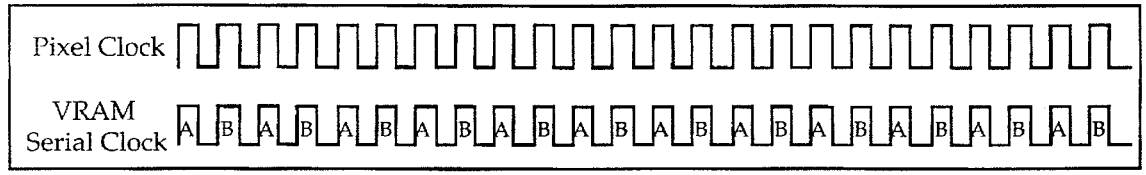
FIG. 5A is a timing diagram illustrating how a pixel clock signal for the display(s) relates to the timing at which the image data is delivered over a 32-bit bus to the video display controller of FIG. 3 for an embodiment having both frame buffers A and B of FIG. 3 operatively stored at 16-bit-per-pixel rate.
Figure 5B:
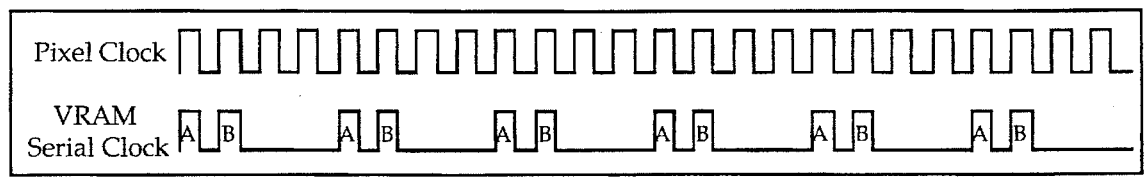
FIG. 5B is a timing diagram illustrating how a pixel clock signal for the display(s) relates to the timing at which the image data is delivered over a 32-bit bus to the video display controller of FIG. 3 for an embodiment having both frame buffers A and B of FIG. 3 operatively stored at 8-bit-per-pixel rate.
Figure 6A:
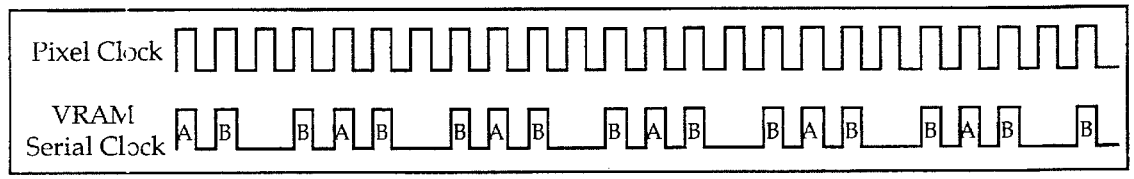
FIG. 6A is a timing diagram illustrating how a pixel clock signal for the display(s) relates to the timing at which the image data is delivered over a 32-bit bus to the video display controller of FIG. 3 for an embodiment having an 8-bit-per-pixel frame buffer A (FIG. 3) and a 16-bit-per-pixel frame buffer B (FIG. 3)

In a preferred embodiment where the two frame buffers 342, 344 store data at the same bit-per-pixel rate, for example, 16 bits per pixel, the typical 32 bits of the multi-bit line 350 leading to the video display controller 330 must be clocked at the full pixel clock rate, i.e., two clock cycles provide two pixels from each of the two frame buffers, 342, 344. But as shown in FIGS. 5A and 5B, if both frame buffers 342, 344 are stored at a rate of 8 bits per pixel, then the image data output from the memory 340 would occur at half the frequency needed for the 16-bit-per-pixel embodiment. Obviously, at 4, 2 or 1 bit-per-pixel rate for both frame buffers 342, 344, the image data output would occur correspondingly less frequent. In the event that the frame buffer A 342 stores data at half of the bit-per-pixel rate of the frame buffer B 344, being "simultaneous" now means delivering to the video display controller 330 the image data from the frame buffer A 342 at half of the rate of the frame buffer B 344. In other words, the video display controller 330 receives the frame buffer A 342 data in one 32-bit word out of three, and receives the frame buffer B 344 data in the other two of three words. For example, FIG. 6A illustrates the corresponding timing relationship for memory data output between the frame buffer A 342 at 8 bits per pixel and the frame buffer B 344 at 16 bits per pixel. Clock pulses for the frame buffer B 344 output occur on the full 32 bits of the multi-bit line 350 once for every two pixel clock cycles, and the pulses for the frame buffer A 342 are interleaved, once for every four pixel clock cycles. In this case, if the video bus width is reduced from 32 bits to 16 bits, then one would have to clock the memory 340 at double the pixel clock rate.

Figure 6B:
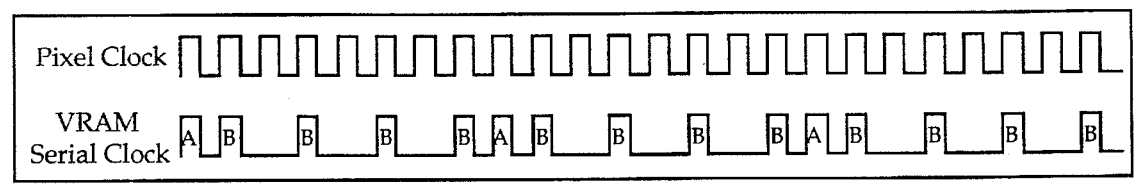
FIG. 6B is a timing diagram illustrating how a pixel clock signal for the display(s) relates to the timing at which the image data is delivered over a 32-bit bus to the video display controller of FIG. 3 for an embodiment having a 4-bit-per-pixel frame buffer A (FIG. 3) and a 16-bit-per-pixel frame buffer B (FIG. 3)

Similarly, referring to FIG. 6B, when the frame buffer A 342 stores data at ¼ the bit-per-pixel rate of the frame buffer B 344, in that case, the frame buffer A 342 stores data in one 32-bit word out of five, while the frame buffer B 344 stores data in the other four of five words. In general, when one frame buffer stores image data at 1/n the bit-per-pixel rate of the other frame buffer, the lower bit-per-pixel frame buffer stores data in one word out of n+1, while the higher bit-per-pixel frame buffer stores data in the other n of n+1 data words. This principle can be extended to cases in which one or both buffers store data at 24 bits per pixel or higher, but the multi-bit line 350 in those cases must be made wider than 32 bits, e.g., 64 bits or 128 bits, or the input port of the video display controller 330 must be clocked at a multiple of the pixel clock rate. In an interleaved image data stream, data from either frame buffer could appear first, however, it is preferred and more advantageous for placing data from the lower bit-per-pixel frame buffer first into the data stream. This is because more pixels could be stored into a single 32-bit word for the lower bit-per-pixel frame buffer. This way, therefore, data from the two frame buffers 342, 344 can be compared or used as soon as each subsequent 32-bit word containing pixel data from the higher bit-per-pixel frame buffers arrives at the video display controller 330.

A more general embodiment for these two frame buffers, therefore, includes a video bus having a sequence of T-bit data words for carrying image information and frame buffer #1 and frame buffer #2. Both frame buffers transfer their image information onto the video bus via separate T-bit data words and that both frame buffers having $P_1$ bits per pixel and $P_2$ bits per pixel respectively where the following conditions should be observed:

1) $P_2/P_1=n$, and n is a number ranging from 1 to T;
2) $T \geq P_1$ and $T \geq P_2$;
3) $X_1$ and $X_2$ being integers and are numbers of pixels separately stored in each T-bit data word for the first logical frame buffer and the second logical frame buffer respectively, $X_1$ ranging from 1 to TRUNCATE (T/$P_1$) and $X_2$ ranging from 1 to TRUNCATE (T/$P_2$); and
4) the sequence of the T-bit data words carrying the image information in a repeating pattern such that for each $X_1$ pixels of the first frame buffer carried there is an immediate corresponding $X_1$ pixels of the second frame buffer also being carried by the sequence so that the pattern repeats itself after every $2X_1$ pixels.

This general embodiment described is for a two-frame-buffer-in-a-single-memory system; similarly, a multiple-frame-buffer-in-a-single-memory system could also be implemented without undue experimentation.

Because the two frame buffers 342, 344 are physically stored into a single memory system, the CPU access of these frame buffers 342, 344 must be adapted for passing those addresses to the memory 340 so the image data stored can be shifted out sequentially in the manner illustrated by FIGS. 5A, 5B, 6A and 6B. In addition, FIG. 7 is an address table illustrating the least significant column bits of the memory addresses to be accessed in sequence by the input port for image data of the video display controller 330, and the appropriate least significant bits of the CPU addresses used by software to access the frame buffer data stored at those memory address. For the multi-bit line 350, CPU address bits A1-0 (not shown) are typically used as byte address bits within a 32-bit word. Each column in FIG. 7 shows the addressing mapping for different bit-per-pixel ratios between the frame buffer A 342 and that of the frame buffer B 344.

In general, if the bit-per-pixel rate of the data stored in the frame buffer B 344 is n times that of the frame buffer A 342, and data from the frame buffer A 342 is placed into the data stream first, then the following transformation must be done to each CPU address (excluding, of course, the byte address bits, e.g., A1-0) so as to generate a VRAM address for frame buffer access.

For accessing the frame buffer A 342:

VRAM address=CPU address+n (CPU address)

For accessing the frame buffer B 344:

VRAM address=CPU address+(CPU address DIV n)+1 where address DIV n is equivalent to shifting the address right y bit positions, where $2^y=n$, which removes y least significant bits from the address.

Now, if data from the frame buffer B is placed into the data stream before that of the frame buffer A, meaning if n words of frame buffer B data is followed by one word of frame buffer A data, then:

For accessing the frame buffer A 342:

VRAM address=CPU address+n (CPU address)+n

For accessing the frame buffer B 344:

VRAM address=CPU address+(CPU address DIV n)

In cases where the multi-bit line 350 is different from 32 bits in width, other than the expected variability for the number of the byte address bits, the above transformation holds.

Figure 8:
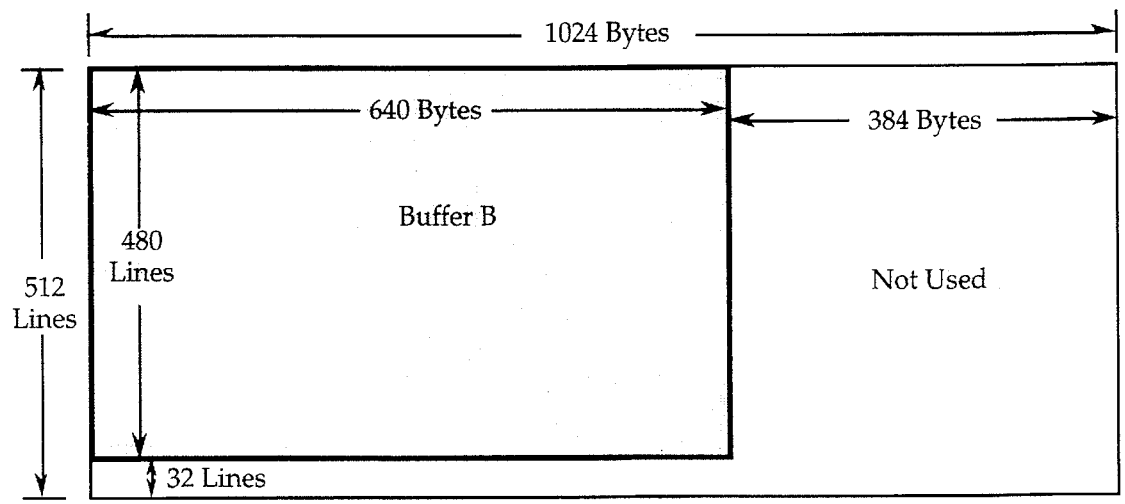
FIG. 8 illustrates how an 8-bit-per-pixel frame buffer B of FIG. 3 with trailing unused memory bytes for a 640×480 display is viewed by software.

Instead of storing data in the memory in a sequential manner, one could take advantage of the fact that software can define a frame buffer in memory as a series of bytes storing the data for the first horizontal line of the display, followed by a fixed gap of unused bytes, and continuing on the next row by another series of bytes for the next line of the display, then another gap of unused bytes, and so on. For a 640×480 display, this makes a frame buffer of 480 lines, each containing the number of bytes needed to store the data for 640 pixels plus a fixed number of unused gap bytes. In practice, using the minimum memory size needed to store the data for a 640×480 display at any given number of bit-per-pixel rate typically leaves sufficient excess memory to make the number of bytes per line (i.e., pixel bytes plus gap bytes) equal to the nearest power-of-two bytes that is larger than the pixel bytes alone. For example, it takes 307,200 bytes to store the data for a 640×480 display at 8 bits per pixel, 480 lines of 640 bytes each. The minimum memory size needed to store this data is 512K bytes (See FIGS. 1A, 1B). As shown in FIG. 8, it is possible to define the frame buffer as 480 lines of 1024 bytes each (1024 is the next power of 2 greater than 640), with a gap of 384 unused bytes at the end of each line of display data. Similarly, FIG. 9 illustrates a 4-bit-per-pixel frame buffer could be stored in a 512K memory with 704 unused bytes following each line of display data.

Figure 9:
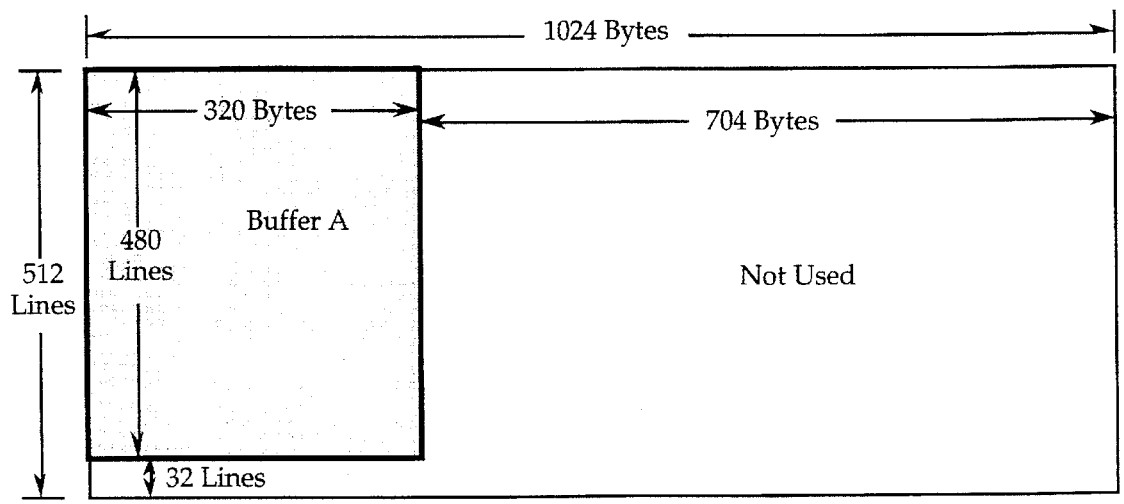
FIG. 9 illustrates how a 4-bit-per-pixel frame buffer A of FIG. 3 with trailing unused memory bytes for a 640×480 display is viewed by software.
Figure 10:
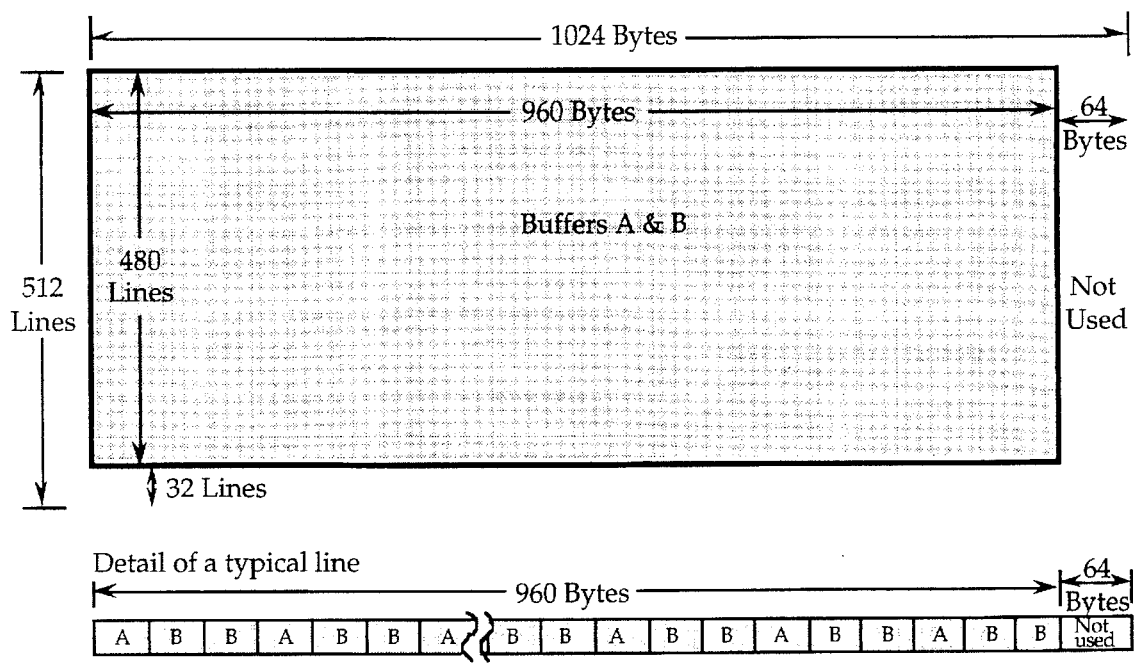
FIG. 10 illustrates how frame buffers in FIGS. 8 and 9 are interleaved in an embodiment in accordance with the present invention and illustrates a word-by-word diagram of a data stream of the frame buffers being delivered to the video display controller of FIG. 3.

Therefore, another preferred embodiment interleaves data bytes of the frame buffers in FIGS. 8 and 9 only within a given horizontal display line. In other words, as shown in FIG. 10, this is effectively storing a line of second frame buffer's data in the unused gap bytes at the end of the corresponding data line of the first frame buffer. For this embodiment wherein the bit-per-pixel rate of the frame buffer B is n times that of the frame buffer A, the following address transformation should be applied to the portions of the CPU addresses that constitute the R bits of row address and the C bits of column address software uses to access the logical frame buffer:

---

For accessing the frame buffer A 342:

VRAM column address = C LSB's of {CPU column address + n (CPU column address)}; and For accessing the frame buffer B 344:

VRAM column address = C LSB's of {CPU column address + (CPU column address DIV n) + 1};

--- where LSB represents least significant bit and where address DIV n is equivalent to shifting the address right y bit positions, where $2^y=n$, which removes y least significant bits from the address.

An advantage for this embodiment is that the conversion of each CPU address to a memory address described above is applied only to the column portion of the CPU address. The row portion of each CPU address is used unchanged as the row address to the memory. This is important because every calculation used in determining the memory's row address delays access to the memory content, and therefore adversely affects overall performance of the video system.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

We claim:

1. A computer system including a processor and a display system, said display system comprises:

a display means for displaying images;

a video bus having a sequence of T-bit data words for carrying image information;

a first logical frame buffer and a second logical frame buffer containing the image information and the image information from each frame buffer is carried in separate T-bit data words and both frame buffers having $P_1$ bits per pixel and $P_2$ bits per pixel respectively where 1) $P_2/P_1=n$, and n is a number ranging from 1 to T;
2) $T \geq P_1$ and $T \geq P_2$;
3) $X_1$ and $X_2$ being integers and are numbers of pixels separately stored in each T-bit data word for the first logical frame buffer and the second logical frame buffer respectively, $X_1$ ranging from 1 to TRUNCATE $(T/P_1)$ and $X_2$ ranging from 1 to TRUNCATE $(T/P_2)$; and
4) the sequence of the T-bit data words carrying the image information in a repeating pattern such that for each $X_1$ pixels of the first frame buffer carried there is an immediate corresponding $X_1$ pixels of the second frame buffer also being carried by the sequence so that the pattern repeats itself after every $2X_1$ pixels;

a memory system of sufficient size for storing the image information as represented by both logical frame buffers, the memory system being coupled to the video bus for transferring the image information, the memory system is arranged such that the two logical frame buffers are stored therein for the simultaneous transfer of the image information from each frame buffer according to a data clock rate; and a video display controller being coupled to the display means and to the video bus for receiving the image information and for processing the image information for use by said display means.

2. The computer system of claim 1 wherein the memory system is further coupled to the processor via a system bus.

3. The computer system of claim 1 wherein the video display controller is coupled to the processor and further includes an address generator for receiving CPU addresses from the processor and for responsively generating memory addresses for accessing the memory system, the address generator converting each CPU address into its memory address counterpart according the following formulae:

For accessing the first logical frame buffer:

memory address=CPU address+$n$ (CPU address)

For accessing the second logical frame buffer:

memory address=CPU address+(CPU address DIV $n$)+1 where address DIV n is equivalent to shifting the address right y bit positions, where $2^y=n$, which removes y least significant bits from the address.

4. The computer system of claim 1 wherein the video display controller is coupled to the processor and further includes an address generator for receiving CPU addresses from the processor and for responsively generating memory addresses for accessing the memory system, the address generator converting each CPU address into its memory address counterpart according the following formulae:

For accessing the first logical frame buffer:

memory address=CPU address+$n$ (CPU address)+$n$

For accessing the second logical frame buffer:

memory address=CPU address+(CPU address DIV $n$)

where address DIV n is equivalent to shifting the address right y bit positions, where $2^y=n$, which removes y least significant bits from the address.

5. The computer system of claim 1 wherein the video display controller is coupled to the processor and further includes an address generator for receiving CPU addresses from the processor and for responsively generating memory addresses including R bits of row address and C bits of column address for accessing the memory system, the CPU addresses including column and row address portions, the address generator leaving the row address portion of the CPU addresses unchanged as the row portion of the memory address and converting column portion of the CPU addresses into their memory address counterparts according the following formulae:

For accessing the first logical frame buffer:

memory column address = C LSB's of {CPU column address + n (CPU column address)}; and For accessing the second logical frame buffer:

memory column address = C LSB's of {CPU column address + (CPU column address DIV n) + 1};

where LSB represents least significant bit and where address DIV n is equivalent to shifting the address right y bit positions, where $2^y=n$, which removes y least significant bits from the address.

6. The computer system of claim 1 wherein said display means includes two displays and wherein said video display controller separates said two logical frame buffers into two separate data streams and directs the data streams individually and separately to the two displays.

7. The computer system of claim 1 wherein said video display controller determines the image information from which frame buffer is to be applied to a specific pixel location on said display means.

8. The computer system of claim 1 wherein said memory system includes DRAM.

9. The computer system of claim 1 wherein said memory system includes VRAM.

10. An expansion card for video display control removably attached to a computer system that has a processor and a display means for displaying images, said expansion card comprises:
- a video bus having a sequence of T-bit data words for carrying image information;
- a first logical frame buffer and a second logical frame buffer containing the image information and the image information from each frame buffer is carried in separate T-bit data words and both frame buffers having $P_1$ bits per pixel and $P_2$ bits per pixel respectively where
  1) $P_2/P_1=n$, and n is a number ranging from 1 to T;
  2) $T \geq P_1$ and $T \geq P_2$;
  3) $X_1$ and $X_2$ being integers and are numbers of pixels separately stored in each T-bit data word for the first logical frame buffer and the second logical frame buffer respectively, $X_1$ ranging from 1 to TRUNCATE $(T/P_1)$ and $X_2$ ranging from 1 to TRUNCATE $(T/P_2)$; and
  4) the sequence of the T-bit data words carrying the image information in a repeating pattern such that for each $X_1$ pixels of the first frame buffer carried there is an immediate corresponding $X_1$ pixels of the second frame buffer also being carried by the sequence so that the pattern repeats itself after every $2X_1$ pixels;
- a memory system of sufficient size for storing the image information as represented by both logical frame buffers, the memory system being coupled to the video bus for transferring the image information, the memory system is arranged such that the two logical frame buffers are stored therein for the simultaneous transfer of the image information from each frame buffer according to a data clock rate; and
- a video display controller being coupled to the display means and to the video bus for receiving the image information and for processing the image information for use by said display means.

11. The expansion card of claim 10 wherein the memory system is further coupled to the processor via a system bus.

12. The expansion card of claim 10 wherein the video display controller is coupled to the processor and further includes an address generator for receiving CPU addresses from the processor and for responsively generating memory addresses for accessing the memory system, the address generator converting each CPU address into its memory address counterpart according the following formulae:

For accessing the first logical frame buffer:

memory address=CPU address+n (CPU address)

For accessing the second logical frame buffer:

memory address=CPU address+(CPU address DIV n)+1 where address DIV n is equivalent to shifting the address right y bit positions, where $2^y=n$, which removes y least significant bits from the address.

13. The expansion card of claim 10 wherein the video display controller is coupled to the processor and further includes an address generator for receiving CPU addresses from the processor and for responsively generating memory addresses for accessing the memory system, the address generator converting each CPU address into its memory address counterpart according the following formulae:

For accessing the first logical frame buffer:

memory address=CPU address+n (CPU address)+n

For accessing the second logical frame buffer:

memory address=CPU address+(CPU address DIV n)

where address DIV n is equivalent to shifting the address right y bit positions, where $2^y=n$, which removes y least significant bits from the address.

14. The expansion card of claim 10 wherein the video display controller is coupled to the processor and further includes an address generator for receiving CPU addresses from the processor and for responsively generating memory addresses including R bits of row address and C bits of column address for accessing the memory system, the CPU addresses including column and row address portions, the address generator leaving the row address portion of the CPU addresses unchanged as the row portion of the memory address and converting column portion of the CPU addresses into their memory address counterparts according the following formulae:

For accessing the first logical frame buffer:

memory column address=C LSB's of {CPU column address+n (CPU column address)}; and For accessing the second logical frame buffer:

memory column address=C LSB's of {CPU column address+ (CPU column address DIV n)+1};

where LSB represents least significant bit and where address DIV n is equivalent to shifting the address right y bit positions, where $2^y=n$, which removes y least significant bits from the address.

15. The expansion card of claim 10 wherein said display means includes two displays and wherein said video display controller separates said two logical frame buffers into two separate data streams and directs the data streams individually and separately to the two displays.

16. The expansion card of claim 10 wherein said video display controller determines the image information from which frame buffer is to be applied to a specific pixel location on said display means.

17. The expansion card of claim 10 wherein said memory system includes DRAM.

18. The expansion card of claim 10 wherein said memory system includes VRAM.

* * * * *